(12) United States Patent
Strode, Jr. et al.

(10) Patent No.: US 11,586,455 B2
(45) Date of Patent: Feb. 21, 2023

(54) MANAGING CONTAINERS ACROSS MULTIPLE OPERATING SYSTEMS

(71) Applicant: Red Hat, Inc., Raleigh, NC (US)

(72) Inventors: Raymond Strode, Jr., Westford, MA (US); Alexander Larsson, Stockholm (SE); Matthias Clasen, Westford, MA (US); Debarshi Ray, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/281,984

(22) Filed: Feb. 21, 2019

(65) Prior Publication Data
US 2020/0272488 A1 Aug. 27, 2020

(51) Int. Cl.
*G06F 9/455* (2018.01)
*G06F 9/46* (2006.01)
(Continued)

(52) U.S. Cl.
CPC ........ *G06F 9/4555* (2013.01); *G06F 9/45512* (2013.01); *G06F 9/45558* (2013.01);
(Continued)

(58) Field of Classification Search
CPC ............. G06F 16/2379; G06F 16/9024; G06F 2009/45579; G06F 2009/45591; G06F 8/60; G06F 9/455; G06F 9/45512; G06F 9/45545; G06F 9/45558; G06F 9/4856; G06F 9/5061; G06F 21/577; G06F 2009/45562; G06F 2009/4557; G06F 21/55; G06F 21/56; H04L 45/02; H04L 63/1408
See application file for complete search history.

(56) References Cited

U.S. PATENT DOCUMENTS 10,606,646 B1 * 3/2020 Christensen .......... G06F 9/5077
10,838,833 B1 * 11/2020 Jibaja .................. G06F 11/0706
(Continued)

FOREIGN PATENT DOCUMENTS

RU 2550559 C2 * 5/2015 ............ H04W 24/08

OTHER PUBLICATIONS

Aspernäs, Andreas, and Mattias Nensén. "Container Hosts as Virtual Machines: A performance study." (2016). Virginia Tech. (Year : 2016).*

(Continued)

*Primary Examiner* — Kenneth Tang
(74) *Attorney, Agent, or Firm* — Lowenstein Sandler LLP

(57) ABSTRACT

Aspects of the disclosure provide for mechanisms for managing containers across operating systems in a computer system. A method of the disclosure includes: running a first container corresponding to a first operating system, wherein the first container is created in view of a container image; receiving a user request to switch from the first operating system to a second operating system; in response to receiving the user request, switching, by a processing device, from the first container to a second container corresponding to the second operating system, wherein the second container is created in view of the container image, wherein switching from the first container to the second container comprises: configuring the second container in view of a plurality of configurations of the first container; and running the configured second container.

20 Claims, 9 Drawing Sheets

(51) Int. Cl.
H04L 41/0806 (2022.01)
H04L 41/084 (2022.01)

(52) U.S. Cl.
CPC .......... G06F 9/461 (2013.01); H04L 41/0806 (2013.01); H04L 41/0846 (2013.01); *G06F 2009/45562* (2013.01); *G06F 2009/45575* (2013.01)

(56) References Cited

U.S. PATENT DOCUMENTS

| | | | | |
|---|---|---|---|---|
| 2013/0124807 | A1* | 5/2013 | Nielsen | G06F 11/1438 711/162 |
| 2013/0298183 | A1* | 11/2013 | McGrath | G06F 21/53 726/1 |
| 2014/0075432 | A1* | 3/2014 | McGrath | G06F 9/455 718/1 |
| 2015/0142878 | A1* | 5/2015 | Hebert | G06F 9/4843 709/203 |
| 2016/0098285 | A1* | 4/2016 | Davis | G06F 9/45545 718/1 |
| 2016/0330073 | A1* | 11/2016 | Li | G06F 21/44 |
| 2017/0093923 | A1 | 3/2017 | Duan | |
| 2017/0322824 | A1* | 11/2017 | Reuther | G06F 3/0632 |
| 2017/0371693 | A1* | 12/2017 | Corrie | G06F 16/188 |
| 2018/0027009 | A1* | 1/2018 | Santos | H04L 63/1433 726/25 |
| 2018/0054314 | A1* | 2/2018 | Edwards | G06F 11/079 |
| 2018/0121189 | A1* | 5/2018 | Philippov | G06F 8/65 |
| 2018/0137093 | A1* | 5/2018 | Goldfarb | G06F 3/04847 |
| 2018/0295059 | A1* | 10/2018 | Gamage | G06F 16/9024 |
| 2018/0309747 | A1* | 10/2018 | Sweet | G06F 9/45558 |
| 2019/0095253 | A1* | 3/2019 | Curtis | H04L 41/5058 |
| 2019/0235900 | A1* | 8/2019 | Singh | G06F 3/0607 |
| 2019/0243628 | A1* | 8/2019 | Goldmann | G06F 8/63 |
| 2019/0354389 | A1* | 11/2019 | Du | G06F 9/45558 |
| 2020/0183716 | A1* | 6/2020 | Beddus | G06F 21/577 |

OTHER PUBLICATIONS

"Apache Mesos". Dec. 18, 2015. Apache Software Foundation. pp. 1-4. (Year: 2015).*

Martin, Antony, et al. "Docker ecosystem—vulnerability analysis." Jun. 1, 2018. Computer Communications 122 (2018): pp. 30-43. (Year: 2018).*

Docker Inc. "Use Bind Mounts" Docket Documentation, accessed Nov. 1, 2018, 9 pages.

Dumpleton, "Jupyter on OpenShift Part 6: Running as an Assigned User ID", Apr. 21, 2017, 13 pages.

Sweeney, "Buildah—build your containers from the ground up!", Project Atomic, Jun. 22, 2017, 7 pages.

* cited by examiner

MANAGING CONTAINERS ACROSS MULTIPLE OPERATING SYSTEMS

TECHNICAL FIELD

The implementations of the disclosure generally relate to computer systems and, more specifically, to managing containers across multiple operating systems in virtualized computer systems.

BACKGROUND

Containerization is an operating-system-level virtualization environment for running multiple isolated system containers on a single host machine. It is an alternative to full machine virtualization that involves encapsulating a process into a container with its own operating environment. Some containerization technologies allow each container to run on the "bare metal" of a host machine while also being able to access a shared instance of a host operating system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
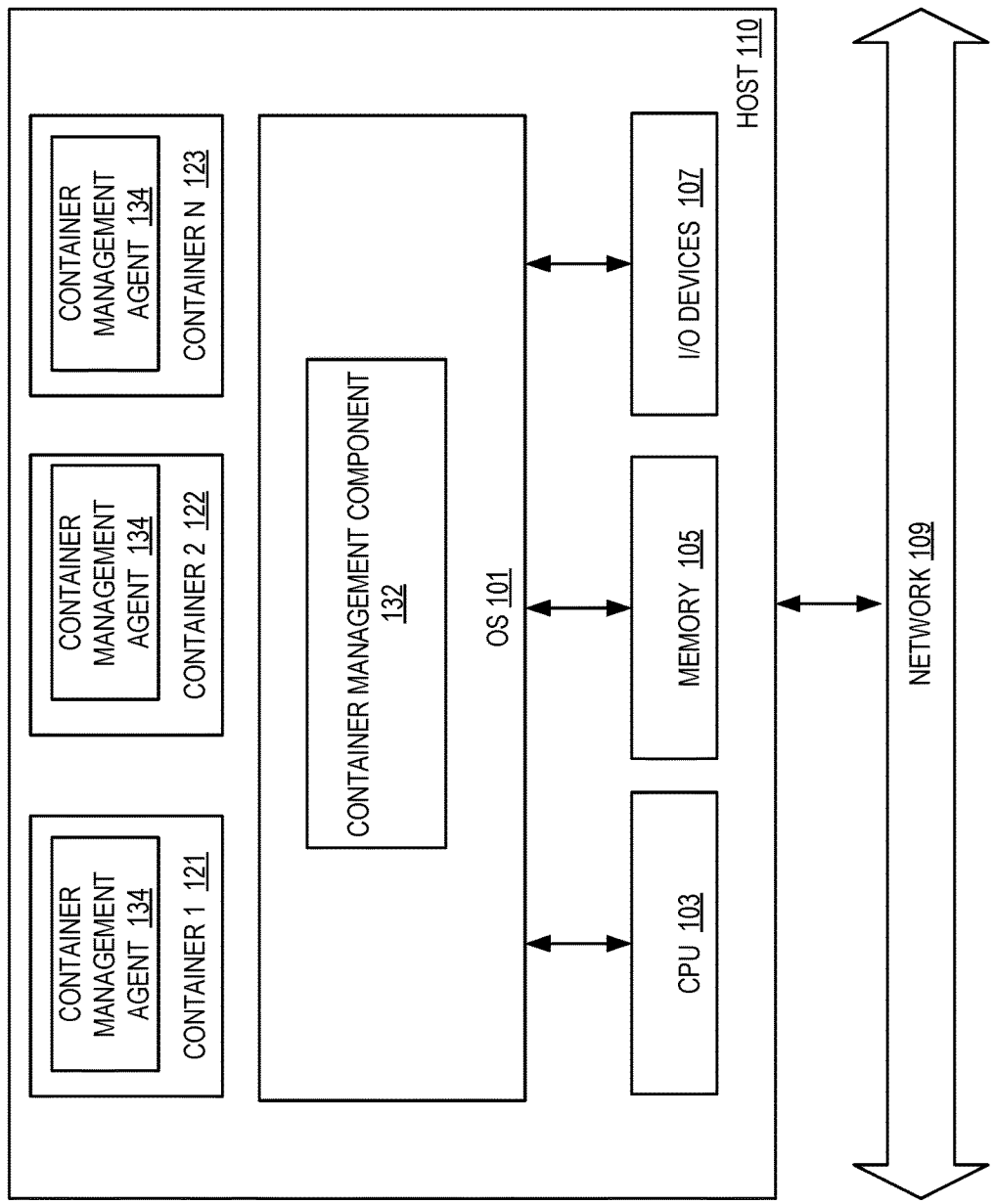
FIG. 1 is a block diagram of a computer system in which implementations of the disclosure may operate.

Many existing host operating systems are developed as one cohesive unit instead of a collection of independently installed system software packages. This may necessitate software development in containers running on a host. A user (e.g., a platform developer) may need to access source code destined for various operating systems, some of which may be overlapping. For example, a patch written for one operating system (e.g., RHEL 8) may also be applicable to another operating system (e.g., Fedora 28). However, existing container management techniques do not provide for solutions to access all sources within containers for various operating systems.

Aspects of the present disclosure address the above and other deficiencies by providing mechanisms (e.g., systems, methods, media) for managing containers across multiple operating systems. The mechanisms disclosed herein can create one or more containers in view of a given container image. Each of the containers may include an installation of a specific operating system. As such, the containers may represent applications of the same source code (e.g., a patch) in various operating systems. As an example, in response to receiving a user request to create a container corresponding to a specific operating system, the mechanisms may create a first container including an installation of a first operating system in view of a container image defining a container. The mechanisms may also run the first container. Accordingly, the mechanisms described herein can switch between containers corresponding to multiple operating systems from within the containers.

In some embodiments, the mechanisms may switch between containers corresponding to multiple operating systems. For example, the mechanisms can create a second container including an installation of a second operating system and can switch from the first container to the second container in response to receiving a user request to switch to the second operating system. In some embodiments, the first operating system may be different than the second operating system. To switch from the first container to the second container and/or from the first operating system to the second operating system, the mechanisms can configure the second container in view of configurations of the first container. For example, the mechanisms may attach a current working directory and/or a home directory related to the first container to the second container. As another example, the mechanisms may import a shell history associated with the first container to the second container. The shell history associated with the first container may include one or more commands that were executed in the first container (e.g., in response to respective commands issued by the user). The mechanisms can then run the configured second container and stop the first container to switch from the first container to the second container. The mechanisms can also switch from the second container to the first container and/or to another container including an installation of a specific operating system in a similar manner. Accordingly, the mechanisms described herein can fork a running container to a new container from within the running container.

The mechanisms can also provide a command line interface (CLI) for managing containers across multiple operating systems. The CLI may be provided to a user (e.g., a software developer) to receive commands issued by the user. The user may use the CLI to issue command concerning containers corresponding to multiple operating systems. For example, the user may issue a command to create and/or run the first container. The mechanisms described herein may create and/or run the first container in response to receiving the command to create and/or run the first container. Upon running the first container, the user may issue commands to manage the first container via the CLI. The user may also issue a command concerning another container and/or operating system via the CLI. For example, the user may issue a command to switch to the second operating system. The mechanisms can then switch from the first container to the second container as described above. As such, the mechanisms described herein can provide the CLI to enable the user to manage multiple containers corresponding to multiple operating systems without switching terminals or manually exiting one container to run another container.

The systems and methods described herein include technology that enhances virtualization technology for a computer system. In particular, aspects of the present disclosure provide technologies that may enable enhanced container management that can manage containers across multiple operating systems and switch between the containers seamlessly. Compared to conventional container management techniques, the techniques disclosed herein may enable a user to switch between containers corresponding to various operating systems without switching terminals, and may thus provide the user with access to source code within the containers for the various operating systems in a transparent manner.

FIG. 1 is a block diagram that illustrates an embodiment of a computer system 100 in which embodiments of the present invention may operate. The computer system 100 may include a host 110. The host 110 may be a server, a workstation, a personal computer (PC), a mobile phone, a personal digital assistant (PDA), or any other suitable computing device. The host 110 may run an operating system (OS) 101 to manage its resources, such as one or more processors 103 communicatively coupled to memory devices 105, and I/O devices 107. The host 110 may run one or more processes. Each of the processes may be a program or a thread of a multi-threaded program. Each of the processes may be a user-space process or a system-level process. Further, each of the processes may run on the host 110 or on a virtual machine hosted by the host 110. In some embodiments, computer system 100 may be and/or include a computer system 900 as described in connection with FIG. 9.

Examples of "processors" (also referred herein as "processing devices" or CPUs) include various devices that are capable of executing instructions encoding arithmetic, logical, or I/O operations. In an illustrative example, a processor may follow Von Neumann architectural model and may include an arithmetic logic unit (ALU), a control unit, and a plurality of registers. In another aspect, a processor may be a single core processor which is capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Examples of "memory devices" include volatile or non-volatile memory devices, such as RAM, ROM, EEPROM, or any other devices capable of storing data. Examples of "I/O devices" include devices providing an interface between a processor and an external device capable of inputting and/or outputting binary data.

In some embodiments, the computer system 100 may be accessible by remote systems via a network 109. The network 109 may be a private network (e.g., a local area network (LAN), a wide area network (WAN), intranet, etc.) or a public network (e.g., the Internet).

The host 110 may include an operating system 101 with one or more user space programs. The operating system may be any program or combination of programs that are capable of using the underlying computing device to perform computing tasks. The operating system may include a kernel comprising one or more kernel space programs (e.g., memory driver, network driver, file system driver) for interacting with virtual hardware devices or actual hardware devices (e.g., para-virtualization). User space programs may include programs that are capable of being executed by the operating system and in one example may be an application program for interacting with a user. The host 110 may comprise a computing device, and may refer to the computing device (e.g., physical machine), a virtual machine, or a combination thereof.

The host 110 may provide one or more levels of virtualization such as hardware-level virtualization, operating system level virtualization, other virtualization, or a combination thereof. The host 110 may provide hardware-level virtualization by running a hypervisor that provides hardware resources to one or more virtual machines. The hypervisor may be any program or combination of programs and may run on a host operating system or may run directly on the hardware (e.g., bare-metal hypervisor). The hypervisor may manage and monitor various aspects of the operation of the computing device, including the storage, memory, and network interfaces. The hypervisor may abstract the physical layer features such as processors, memory, and I/O devices, and present this abstraction as virtual devices to a virtual machine.

The host 110 (e.g., physical machine or virtual machine) may also or alternatively provide operating system level virtualization by running a computer program that provides computing resources to one or more containers 121, 122, 123. Operating system level virtualization may be implemented within the kernel of the operating system and may enable the existence of multiple isolated containers. In one example, operating system level virtualization may not require hardware support and may impose little to no overhead because programs within each of the containers may use the system calls of the same underlying operating system. This enables the host 110 to provide virtualization without the need to provide hardware emulation or be run in an intermediate virtual machine as may occur with hardware-level virtualization.

Operating system level virtualization may provide resource management features that isolate or limit the impact of one container (e.g., container 121) on the resources of another container (e.g., container 122 or 123). The operating system level virtualization may provide a pool of resources that are accessible by container 121 and are isolated from one or more other containers (e.g., container 122). The pool of resources may include file system resources (e.g., particular volume), network resources (e.g., particular network address), memory resources (e.g., particular memory portions), other computing resources, or a combination thereof. The operating system level virtualization may also limit a container's access to one or more computing resources by monitoring the containers activity and restricting the activity in view of one or more limits (e.g., quotas). The limits may restrict the rate of the activity, the aggregate amount of the activity, or a combination thereof. The limits may include one or more of disk limits, input/out (I/O) limits, memory limits, CPU limits, network limits, other limits, or a combination thereof. In one example, an operating system virtualizer provides the computing resources to containers 121, 122, 123. The operating system virtualizer may wrap an application in a complete file system that contains the code, runtime, system tools, system libraries and other programs installed on the host that can be used by the application. In one example, the operating system virtualizer may be the same or similar to Docker for Linux®, ThinApp® by VMWare®, Solaris Zones® by Oracle®, or other program that automates the packaging, deployment, and execution of applications inside containers.

Each of the containers 121, 122, 123 may refer to a resource-constrained process space of the host 110 that can execute functionality of a program. Containers 224A-C may be referred to as a user-space instances, a virtualization engines (VE), or jails and may appear to a user as a standalone instance of the user space of an operating system. Each of the containers 121, 122, 123 may share the same kernel but may be constrained to only use a defined set of computing resources (e.g., CPU, memory, I/O). As will be discussed in greater detail below, the containers 121, 122, 123 may include installations of various operating systems. For example, the container 121 and the container 122 may include an installation of a first operating system and an installation of a second operating system, respectively. The first operating system and the second operating system may be different. For example, the first operating system and the second operating system may be different versions of a particular operating system (e.g., Fedora 28, Fedora, 29, etc.). As another example, the first operating system and the second operating system may be different operating systems (e.g., Fedora and RHEL (Red Hat Enterprise Linux Operating System)).

As illustrated, the host 110 may include a container management component 132 that can manage containers hosted on the computer system 100 (e.g., containers 121, 122, 123). In one implementation, the container management component 132 may be part of the OS 101. In another implementation, the container management component 132 may be implemented as a program that is not part of the OS 101.

The container management component 132 may manage containers corresponding to various operating systems. For example, the container management component 132 may create a first container to include an installation of a first operating system. In some embodiments, the first container may be created by the container management component 132 in response to receiving a user request to create the first container. The user request may include a command and may include information identifying the first operating system and/or the first container. As an example, the user request may include a command for cloning a container (also referred to as the "first command"), such as "$ clone fedora:f28-os-developer f28." As shown, the first command may include information identifying a container and/or container image to be used to create the first container (e.g., an identifier "fedora:f28-os-developer" that identifies the container and/or container image). The first command may also include information identifying the first operating system (e.g., an identifier "f28" that identifies the first operating system). Upon receiving the first command, the container management component 132 may obtain a container image defining the first container (e.g., a container image associated with an identifier of "fedora:f28-os-developer") and may create the first container in view of the container image. In some embodiments, the container image may be obtained (e.g., retrieved) from a repository for storing container images (e.g., a container registry). The container management component 132 may also configure the container in view of default configurations associated with the container image (e.g., configurations stored on the repository).

Upon creating the first container, the container management component 132 may run the first container. In some embodiments, the container management component 132 may run the first container in response to receiving a user request to run the first container, such as a command for running the first container (also referred to as the "second command"). The second command may include a command to "jump in" the first container and/or switch to the first operating system (e.g., "$ jumpin f28"). In response to receiving the user request to run the first container, the container management component 132 may start the obtained container image, configure the first container, and run the configured first container. To configure the first container, the container management component 132 can attach a current working directory associated with the user to the first container (e.g., by bind mounting the current working directory into the first container). The current working directory may be a directory of one or more processes that are executed on the host for the user. The container management component 132 can also attach a home directory associated with the user to the first container. The container management component 132 may further associate a user identifier of the user and/or one or more SSH keys with the first container. In one implementation, the container management component 132 may configure the first container by configuring a file including the home directory, the user identifier, the SSH keys, etc. (e.g., setting up entries in a /etc/passwd file that correspond to the home directory, the user identifier, the SSH keys, etc.). In another implementation, the container management component 132 may configure the first container using a Name Service Switch module.

In some embodiments, the container management component 132 may also import a shell history associated with the user into the first container to configure the first container. The shell history may include one or more commands issued by the user via a shell running on the host. The shell may be a user interface for access to an operating system of the host. The shell history may be imported, for example, by saving the shell history to a storage device accessible to the first container.

Similarly, the container management component 132 may create a second container corresponding to a second operating system, a third container corresponding to a third operating system, etc. As such, the container management component 132 may create and/or run multiple containers including installations of various operating systems for a user. The containers may be created using the same container image. Each of the containers may include an installation of a specific operating system. The containers may thus represent applications of the same source code in various operating systems.

The container management component 132 may switch between the containers corresponding to the multiple operating systems. For example, the container management component 132 may switch from the first container to the second container in response to receiving a user request to switch from the first operating system to the second operating system. The user request may be and/or include a command for switching to the second operating system (also referred to as the "third command"), such as a command including "$ jumpin rhel 8." The third command may include identifying information that identifies the second operating system (e.g., "rhel 8"). To switch from the first container to the second container, the container management component 132 may configure the second container in view of configurations of the first container and may then run the configured second container. For example, the container management component 132 may attach a current working directory related to the first container to the second container. As another example, the container management component 132 may import a shell history associated with the first container to the second container. In some embodiments, the container management component 132 may stop the first container upon running the second container.

The container management component 132 may also create one or more copies of a container corresponding to a specific operating system (e.g., by "forking" the container).

For example, the container management component 132 may create a container in view of the first container (also referred to as the "forked container") in response to receiving a request to fork the first container. The forked container may represent a copy of the first container. A user may make changes to the forked container without affecting the first container. The container management component 132 may then switch from the first container to the forked container. For example, the container management component 132 may configure the forked container in view of configurations of the first container. To configure the forked container, the container management component 132 may attach a current working directory related to the first container to the forked container, associate the user identifier related to the first container with the forked container, import a home directory related to the first container to the forked container, etc. The container management component 132 may then run the configured forked container and/or stop the first container. The container management component may also switch back to the first container in response to receiving a user request to switch back to the first container.

The container management component 132 may provide a user interface, such as a command line interface (CLI) or graphical user interface (GUI), for managing the containers across the various operating systems. The container management component 132 may accept user inputs (e.g., commands) concerning containers corresponding to multiple operating systems via the user interface and may then execute the commands. As such, the user interface may enable a user to manage containers across multiple operating systems in the same terminal for execution. As an example, the container management component 132 may provide a CLI for managing the first container. More specifically, for example, the container management component 132 may receive one or more commands concerning the first container (e.g., the first command for creating the first container, the second command for running the first container) via the CLI and may cause the command(s) to be executed. As another example, the container management component 132 may receive one or more commands concerning one or more other containers while managing the first container, such as the third command for switching to the second operating system and/or the second container. The container management component 132 may then switch to the second operating system and/or the second container as described above.

Upon running the first container, the container management component 132 can provide a shell prompt including information about the first container, such as a description of the first container, a description of the first operating system, the current working directory associated with the first container, etc.

To implement the CLI, the container management component 132 may attach a shell to a given container upon creating and/or running the container. For example, the container management component may import a container management agent 134 into the given container to run the shell in the given container. The container management agent 134 may be and/or include a shell script (e.g., a wrapper script) or any other suitable computer program that may facilitate executions of commands in the container as described herein. The container management agent 134 may be bind-mounted to the first container to be imported into the given container. The imported container management agent 134 may communicate with the container management component 132 to facilitate executions of commands with respect to the given container. For example, the imported container management agent 134 may receive a command issued by a user. The imported container management agent 134 may send one or more messages to the container management component 132 to indicate the receipt of the command and/or to initiate execution of the command by the host.

In some embodiments, the imported container management agent 134 may communicate with the container management component 132 via one or more methods of inter-process communication, such as a pipe that is accessible to both the container management agent 134 and the container management component 132. The pipe may be a sequence of processes chained together by their standard streams, so that the output of each process feeds directly as input to the next process. In some embodiments, the imported container management agent 134 may write to the pipe while the container management component 132 may read from the pipe.

As an example, the container management component 132 may attach a shell to the first container by importing a container management agent 134 into the first container upon creating the first container. The imported container management agent 134 may receive the second command for running the first container and/or any other command issued within the first container. The container management agent 134 may then send a message to the container management component 132 to indicate the receipt of the second command. Upon receiving the message, the container management component may configure the first container as described above and/or run the configured first container. As another example, the container management agent 134 running in the first container may receive the third command for switching to the second operating system. The container management agent 134 may send one or more messages to the container management component 132 to indicate the receipt of the third command. Upon receiving the messages, the container management component 132 may switch to the second operating system as described above (e.g., by creating the second container, configuring the second container, running the second container, etc.). Upon creating the second container, the container management component 132 may attach a shell to the second container.

In some embodiments, the container management component 132 may perform various operations discussed herein with reference to FIGS. 2-8 that manage containers across multiple operating systems.

Figure 2:
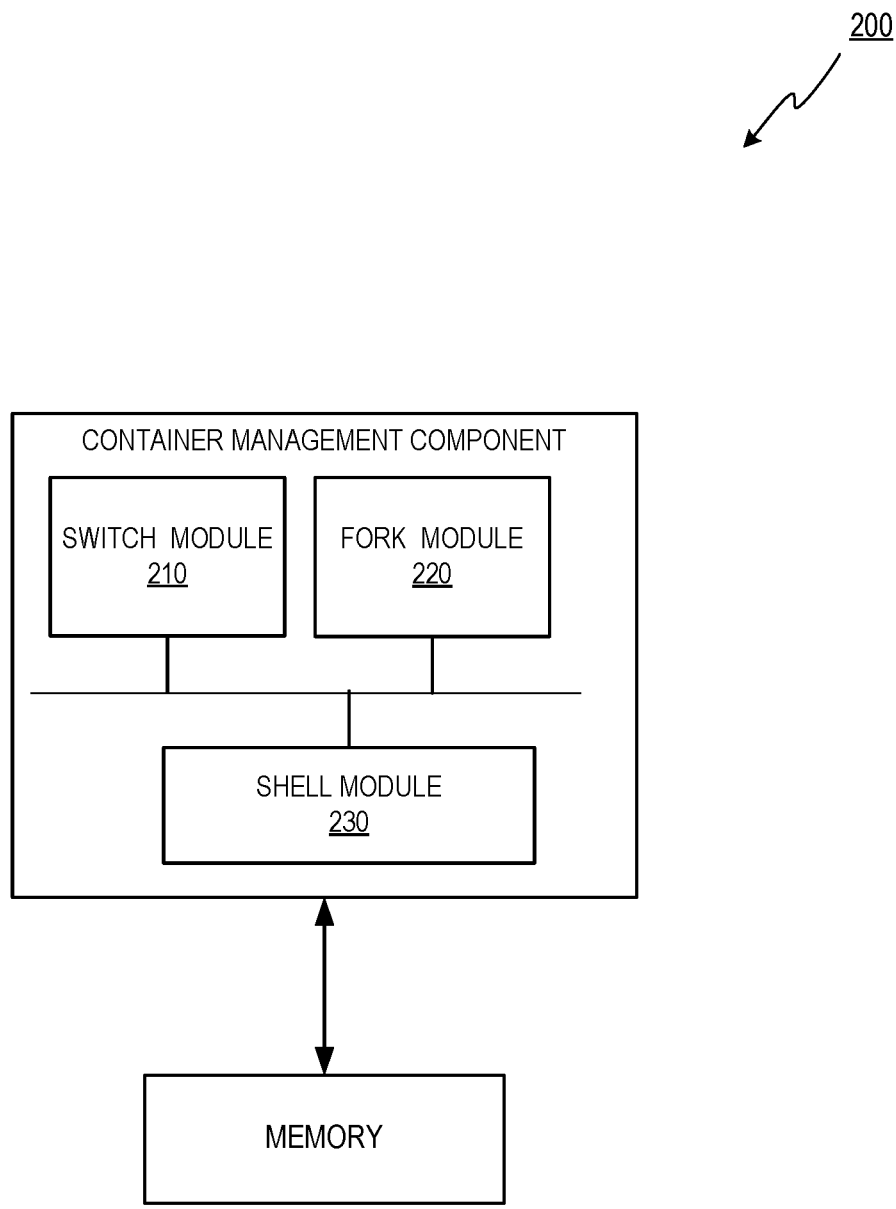
FIG. 2 is a block diagram of a detailed view of a computer system implementing a container management component according to an implementation of the disclosure.

FIG. 2 depicts a block diagram illustrating an example 200 of a computer system in accordance with some implementations of the disclosure. The container management component of FIG. 2 may be the same as the container management component 132 of FIG. 1. As illustrated, the scheduler component may include a switch module 210, a fork module 220, and a shell module 230. More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The switch module 210 may switch between containers corresponding to various operating systems. The container may be created in view of the same container image and may thus represent applications of the same source code in the various operating systems. As an example, the switch module 210 may switch from a first container including an installation of a first operating system to a second container including an installation of a second operating system in response to receiving a user request to switch from the first operating system to the second operating system. To switch from the first container to the second container, the switch module 210 may configure the second container in view of one or more configurations of the first container (e.g., by attaching a current working directory related to the first container to the second container, importing a shell history associated with the first container to the second container, associating a user identifier related to the first container with the second container, importing a home directory related to the first container to the second container, etc.). The switch module 210 may run the configured second container and may stop the first container to switch from the first operating system to the second operating system.

The fork module 220 may create one or more forked containers of a given container. Each of the forked containers may represent a copy of the given container. As an example, the fork module 220 can create a forked container by creating a copy of the given container and configuring the forked container in view of configurations of the given container. For example, the fork module 220 can attach a current working directory related to the given container to the forked container (e.g., by binding mount the current working directory in the forked container). As another example, the fork module 220 can identify a user identifier associated with the given container and may associate the user identifier with the forked container. As still another example, the fork module 220 can import a home directory related to the given container to the forked container. The fork module 220 can run the configured forked container and can stop the first container to switch from the given container to the forked container. A user may make changes to the forked container to test changes to be made to the given container without affecting the given container.

The shell module 230 may provide a user interface (e.g., a CLI, GUI, etc.) for managing containers across multiple operating systems. In some embodiments, the shell module 230 may receive commands concerning multiple containers (e.g., the first container, the second container, forked containers, etc.) via the user interface. For example, the Shell module 230 may provide a CLI for managing the first container while the first container is running. The shell module 230 may receive a command to switch to the second operating system via the CLI. The command may then be executed. For example, the switch module 210 may switch to the second container and/or the second operating system as described above. The shell module 230 may also provide one or more prompts related to the second container in the CLI. The one or more prompts may include information related to the second container and an identification of a working directory related to the first container. In some embodiments, the shell module 230 can provide a shell history related to the second container in response to receiving a user request (e.g., a command) for the shell history. The shell history related to the second container may include a shell history related to the first container.

Figure 3:
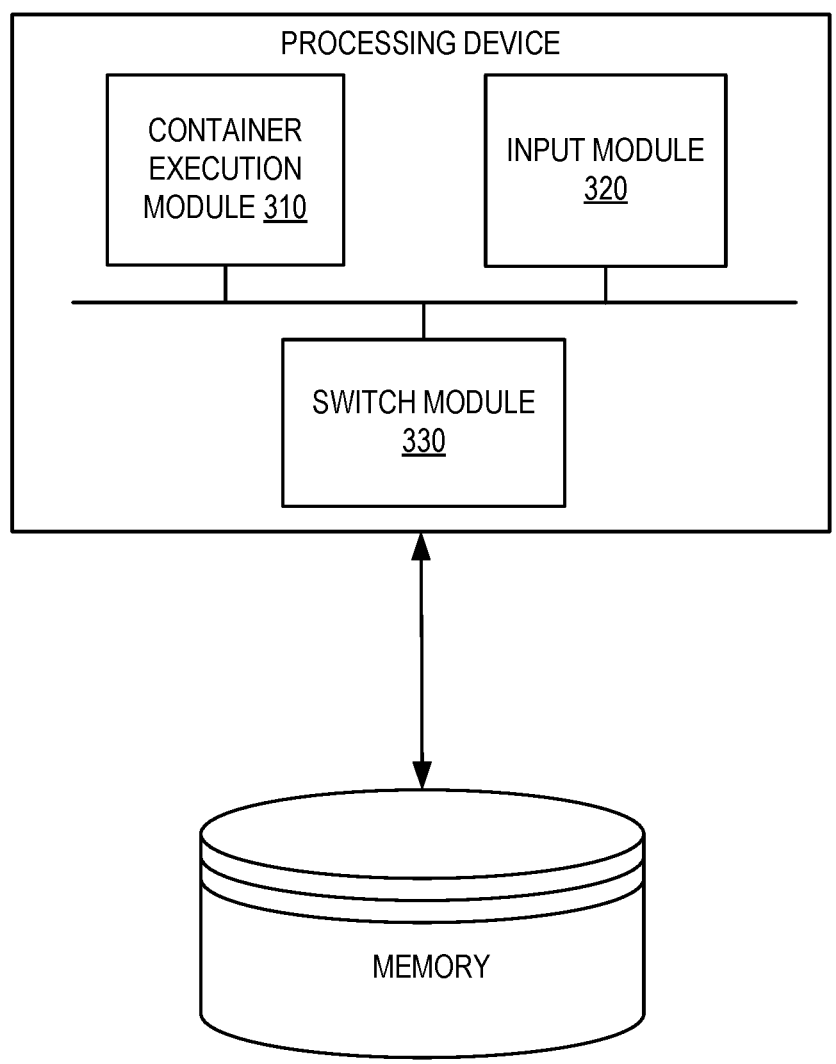
FIGS. 3, 4, and 5 depict block diagrams of example computer systems operating in accordance with one or more aspects of the present disclosure.
Figure 4:
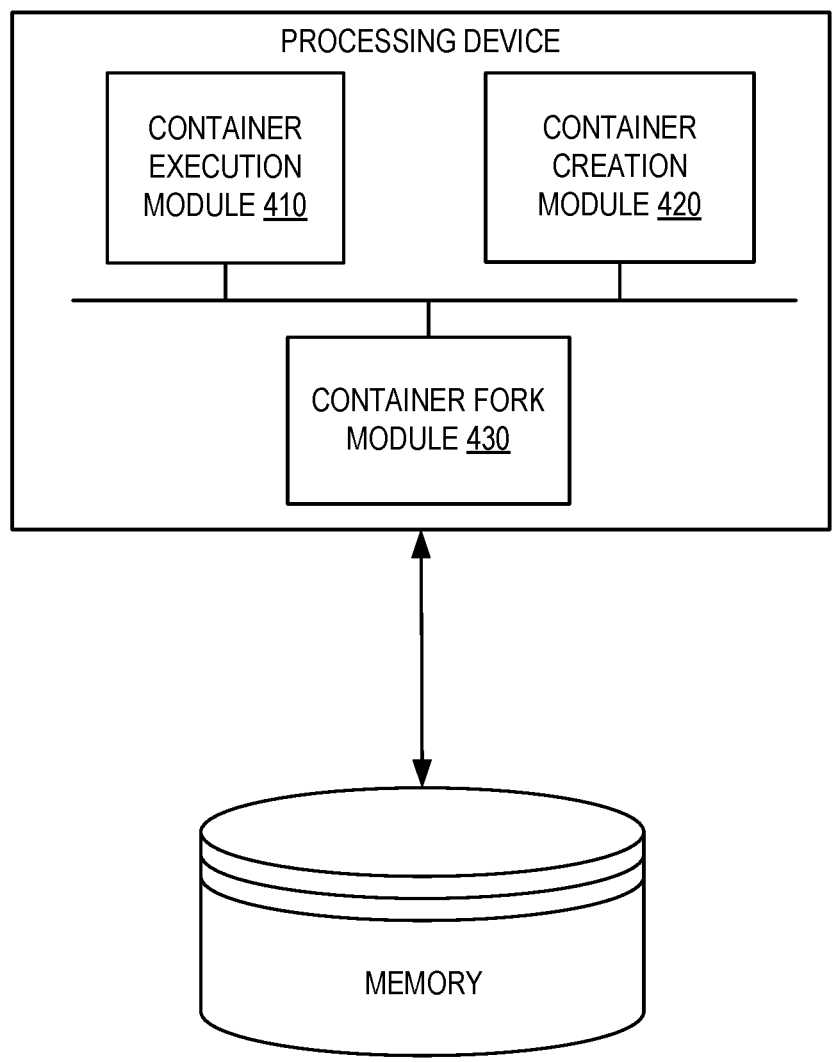
Figure 5:
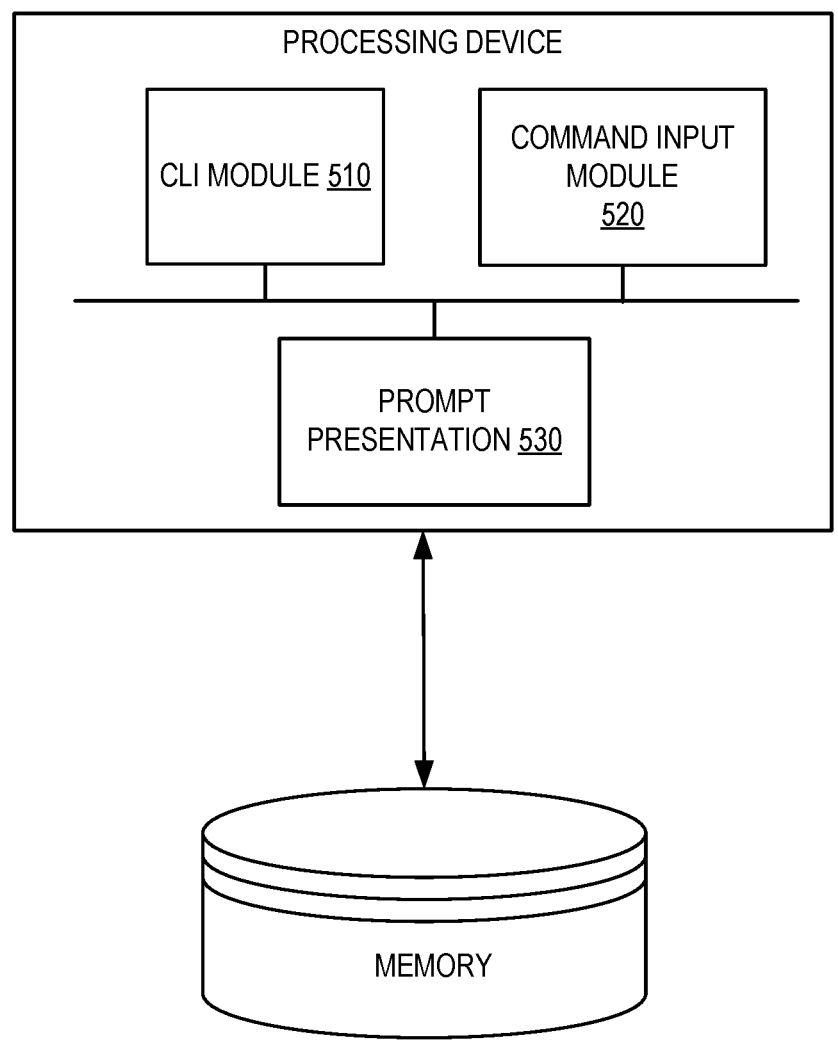

FIGS. 3, 4, and 5 depict block diagrams of example computer systems operating in accordance with one or more aspects of the present disclosure. Each of computer systems 300, 400, and 500 may be the same or similar to computer system 100 and may include one or more processing devices and one or more memory devices. Each of computer systems 300, 400, and 500 may further include a memory for storing data to be used to implement embodiments of the present disclosure.

Referring to FIG. 3, computer system 300 may include a container execution module 310, an input module 320, and a switch module 330.

The container execution module 310 may run one or more containers corresponding to one or more operating systems. For example, the container execution module 310 can run a first container corresponding to a first operating system. The first container may include an installation of the first operating system. The first container may be created in view of a container image. In some embodiments, the container execution module 310 may receive a user request to run the first container (e.g., via a CLI). The container execution module 310 may then run the first container in view of the user request.

The input module 320 may receive user requests concerning one or more containers. For example, the input module 320 can receive a user request (e.g., a command) to switch from the first operating system to a second operating system. The second operating system may be different than the first operating system. In some embodiments, the request to switch to the second operating system and the request to run the first container may be received via the same command line interface.

The switch module 330 may switch between various containers corresponding to one or more operating systems. For example, the switch module 330 may switch from the first container to a second container corresponding to the second operating system in response to receiving the user request to switch to the second operating system. The second container may be created in view of the container image and may include an installation of the second operating system. To switch from the first container to the second container, the switch module 330 may configure the second container in view of one or more configurations of the first container (e.g., by attaching a current working directory related to the first container to the second container, importing a shell history associated with the first container to the second container, associating a user identifier related to the first container with the second container, importing a home directory related to the first container to the second container, etc.). The switch module 330 may run the configured second container and may stop the first container to switch from the first operating system to the second operating system.

Referring to FIG. 4, computer system 400 may include a container execution module 410, a container creation module 420, and a container fork module 430.

The container execution module 410 may run one or more containers corresponding to one or more operating systems. For example, the container execution module 410 can run a first container corresponding to a first operating system. The first container may include an installation of the first operating system. The first container may be created in view of a container image. In some embodiments, the container execution module 410 may receive a user request to run the first container (e.g., via a CLI). The container execution module 410 may then run the first container in view of the user request.

The container creation module 420 may create one or more containers corresponding to one or more operating systems. For example, the container creation module 420 can create a second container in response to receiving a user request to create a copy of the first container. The user request may include a command for forking the first container. In some embodiments, creating the second container in view of the first container comprises creating a copy of the first container. The second container may represent a copy of the first container. A user may make changes to the second container (the copy of the first container) without affecting the first container.

The container fork module 430 may switch between various containers, such as the first container and the second container. For example, the container fork module 430 can switch from the first container to the second container. To switch from the first container to the second container, the container fork module 430 may configure the second container in view of a plurality of configurations of the first container. For example, the container fork module 430 may attach a current working directory related to the first container to the second container (e.g., by binding mount the current working directory in the second container). As another example, the container fork module 430 can identify a user identifier associated with the first container and may associate the user identifier with the second container. As still another example, the container fork module 430 can import a home directory related to the first container to the second container. The container fork module 430 can run the configured second container and can stop the first container to switch from the first container to the second container.

Referring to FIG. 5, computer system 500 may include a CLI module 510, a command input module 520, and a prompt presentation module 530.

The CLI module 510 may provide a CLI for managing containers across multiple operating systems. For example, the CLI module 510 may provide the command line interface for managing a first container corresponding to a first operating system. The first container may include an installation of the first operating system. The first container may be created in view of a container image defining a container.

The command input module 520 may receive commands concerning the first container and/or any other containers across the multiple operating systems. For example, the command input module 520 may receive one or more commands concerning the first container, such as a command for creating the first container (e.g., a command for cloning a container), a command for running the first container, etc. As another example, the command input module 520 may receive, via the command line interface one or more commands concerning a second container corresponding to a second operating system, such as a command for switching to the second operating system, a command for creating the second container (e.g., a command for forking the first container), etc.

The prompt presentation module 530 may present prompts in the CLI. Each of the prompts may include one or more characters indicating readiness to accept commands via the command line interface. The prompts may prompt a user to enter commands or take any other action via the command line interface.

In some embodiments, in response to receiving the one or more commands concerning the second container, the prompt presentation module 530 may provide at least one prompt related to the second container in the command line interface. The at least one prompt may include information related to the second container and an identification of a working directory related to the first container. In some embodiments, the prompt presentation module 530 can provide a shell history related to the second container. The shell history related to the second container may include a shell history related to the first container. The shell history related to the second container may be provided (e.g., presented) in the command line interface in response to receiving a command for requesting the shell history related to the second container.

In some embodiments, the processing device can also receive one or more commands concerning the first container via the command line interface. For example, the processing device may receive a third command for switching from the second operating system to the first operating system. In view of the third command, the processing device can provide, in the command line interface, at least one prompt related to the first container in the command line interface. The at least one prompt related to the first container may include information related to the first container and an identification of a working history related to the second container.

Figure 6:
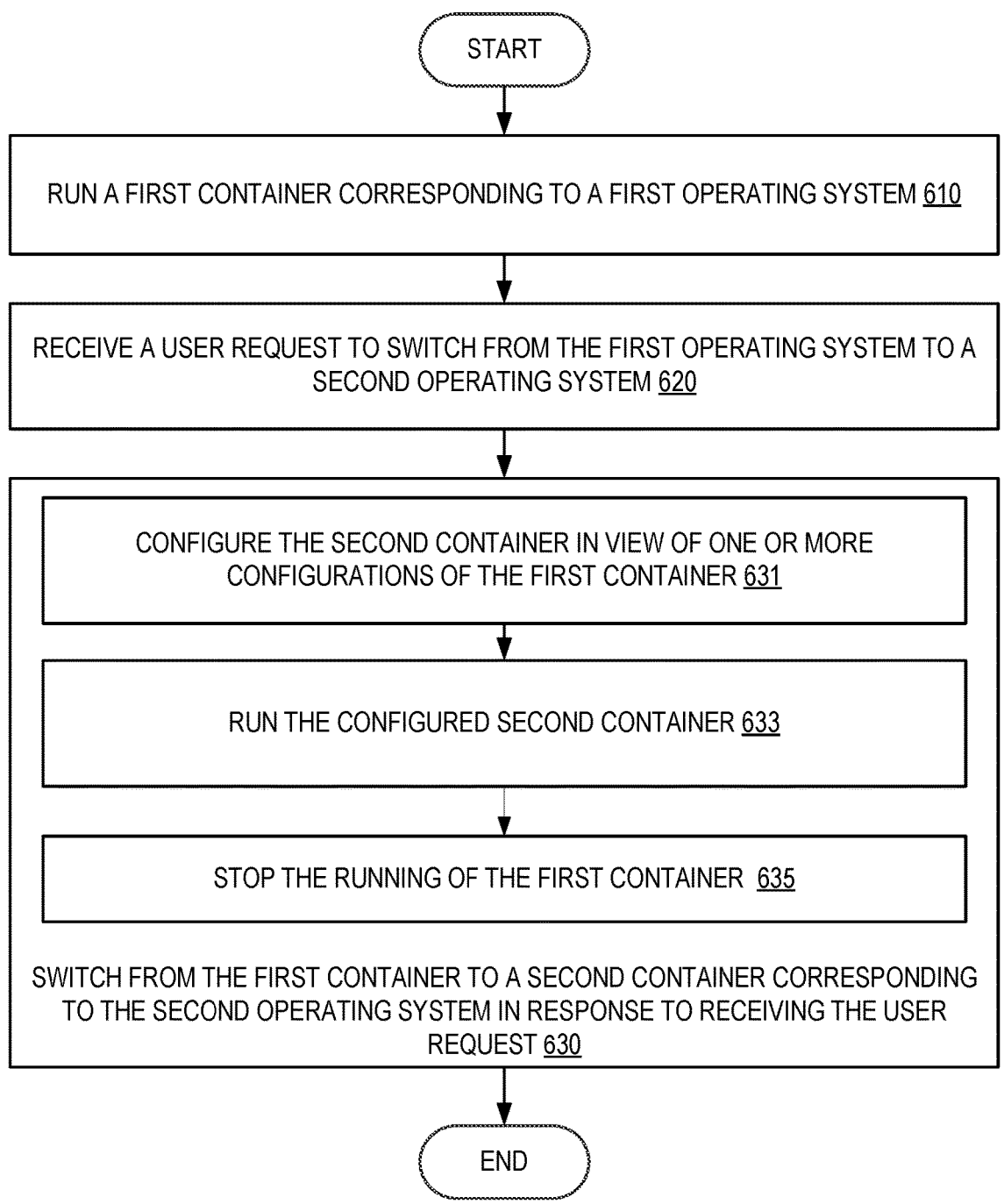
FIG. 6 is a flow diagram illustrating a method for managing containers corresponding to various operating systems in a computer system in accordance with some embodiments of the present disclosure.
Figure 7:
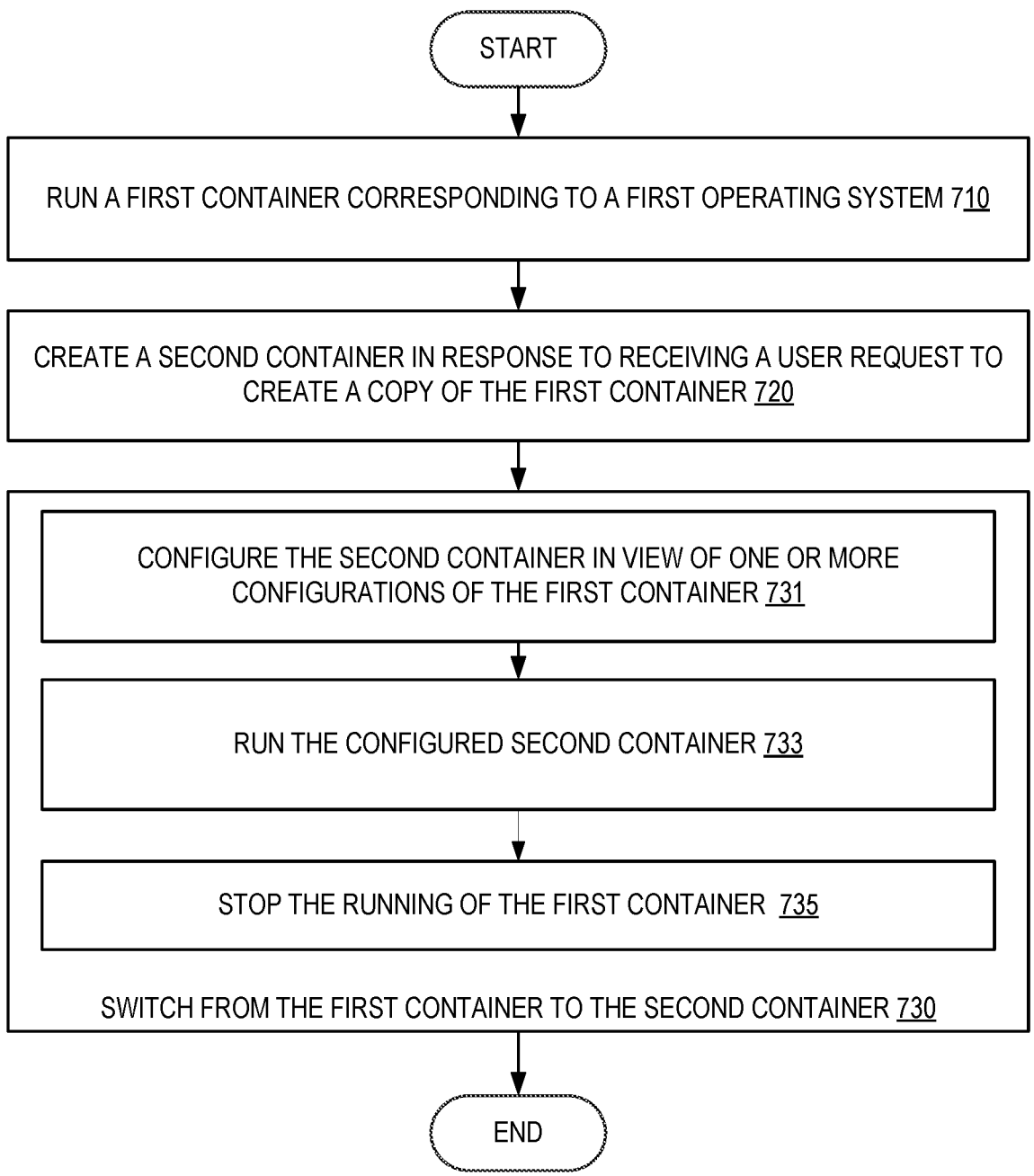
FIG. 7 is a flow diagram illustrating a method for creating copies of a container in accordance with some embodiments of the present disclosure.
Figure 8:
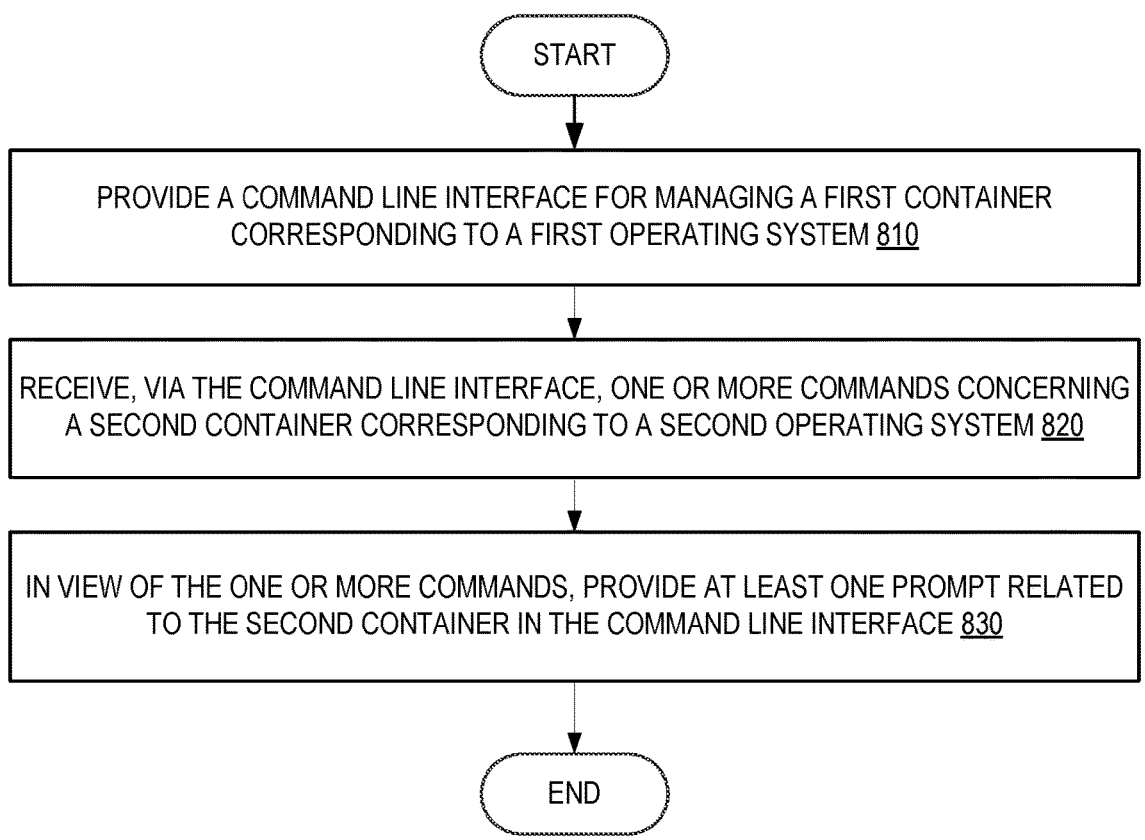
FIG. 8 is a flow diagram illustrating a method for providing a command line interface in accordance with some embodiments of the present disclosure.

FIGS. 6, 7, and 8 are flow diagrams illustrating methods 600, 700, and 800 for containers management in a virtualized computer system in accordance with one or more aspects of the present disclosure. Method 600 illustrates an example process for managing containers corresponding to various operating systems in a computer system in accordance with some embodiments of the present disclosure. Method 700 illustrates an example process for creating copies of a container in accordance with some embodiments of the present disclosure. Method 800 illustrates an example process for providing a command line interface in accordance with some embodiments of the present disclosure. Methods 600, 700, and 800 may be performed by processing devices that may comprise hardware (e.g., circuitry, dedicated logic, programmable logic, microcode, etc.), executable code (such as is run on a general-purpose computer system or a dedicated machine), or a combination of both. Methods 600, 700, and 800 and each of their individual functions, routines, subroutines, or operations may be performed by one or more processors of the computer device executing the method. In certain implementations, methods 600, 700, and 800 may each be performed by a single processing thread. Alternatively, methods 600, 700, and 800 may be performed by two or more processing threads, each thread executing one or more individual functions, routines, subroutines, or operations of the method. In an illustrative example, the processing threads implementing methods 600, 700, and 800 may be synchronized (e.g., using semaphores, critical sections, and/or other thread synchronization mechanisms). Alternatively, the processes implementing methods 600, 700, and 800 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 600, 700, and 800 may be performed by computer system 100 as shown in FIG. 1.

Referring to FIG. 6, method 600 begins at block 610 where the processing device may run a first container corresponding to a first operating system. In some embodiments, the first container may be created in view of a container image. In some embodiments, the first container may be created and/or run in response to receiving a user request to create and/or run the first container (e.g., a command for cloning the first container, a command for running the first container). In some embodiments, the user request to create and/or run the first container may be received via a command line interface.

At block 620, the processing device can receive a user request to switch from the first operating system to a second operating system. The request to switch to the second operating system may include information identifying the second operating system. The second operating system may be different from the first operating system. In some embodiments, the request to switch to the second operating system and the request to run the first container may be received via the same command line interface.

At block 630, the processing device may switch from the first container to a second container corresponding to the second operating system in response to receiving the user request. The second container may be created in view of the container image and may include an installation of the second operating system. To switch from the first container to the second container, the processing device may perform one or more operations depicted in blocks 631-635. At block 631, the processing device can configure the second container in view of one or more configurations of the first container. For example, the processing device can attach a current working directory related to the first container to the second container. As another example, the processing device can import a shell history associated with the first container to the second container. As a further example, the processing device can identify a user identifier associated with the first container and can associate the user identifier with the second container. As a further example, the processing device can import a home directory related to the first container to the second container.

At block 633, the processing device can run the configured second container. At block 635, the processing device may also stop the running and/or execution of the first container while running the second container.

Referring to FIG. 7, method 700 begins at block 710 where the processing device may run a first container corresponding to a first operating system. The first container may be created in view of a container image defining a container. The first container may include an installation of the first operating system.

At block 720, the processing device may create a second container in response to receiving a user request to create a copy of the first container. The user request may include a command for forking the first container. In some embodiments, creating the second container in view of the first container comprises creating a copy of the first container.

At block 730, the processing device can switch from the first container to the second container. To switch from the first container to the second container, the processing device may perform one or more operations depicted in blocks 731-735. At block 731, the processing device may configure the second container in view of a plurality of configurations of the first container. For example, the processing device may attach a current working directory related to the first container to the second container (e.g., by binding mount the current working directory in the second container). As another example, the processing device can identify a user identifier associated with the first container and may associate the user identifier with the second container. As still another example, the processing device can import a home directory related to the first container to the second container.

At block 733, the processing device may run the configured second container. At block 735, the processing device may also stop the running and/or exeuction of the first container to switch from the first container to the second container.

Referring to FIG. 8, method 800 begins at block 810 where the processing device may provide a command line interface for managing a first container corresponding to a first operating system. The first container may include an installation of the first operating system. The first container may be created in view of a container image defining a container.

At block 820, the processing device may receive, via the command line interface one or more commands concerning a second container corresponding to a second operating system. The second container may also be created in view of the container image in some embodiments. The second container may include an installation of the second operating system. The second operating system may be different than the first operating system. The one or more commands may include, for example, a command for switching to the second operating system and/or the second container.

At block 830, in view of the one or more commands, the processing device may provide at least one prompt related to the second container in the command line interface. The at least one prompt may include information related to the second container and an identification of a working directory related to the first container.

In some embodiments, the processing device can provide a shell history related to the second container. The shell history related to the second container may include a shell history related to the first container. The shell history related to the second container may be provided (e.g., presented) in the command line interface in response to receiving a command for requesting the shell history related to the second container.

In some embodiments, the processing device can also receive one or more commands concerning the first container via the command line interface. For example, the processing device may receive a third command for switching from the second operating system to the first operating system. In view of the third command, the processing device can provide, in the command line interface, at least one prompt related to the first container in the command line interface. The at least one prompt related to the first container may include information related to the first container and an identification of a working history related to the second container.

Figure 9:
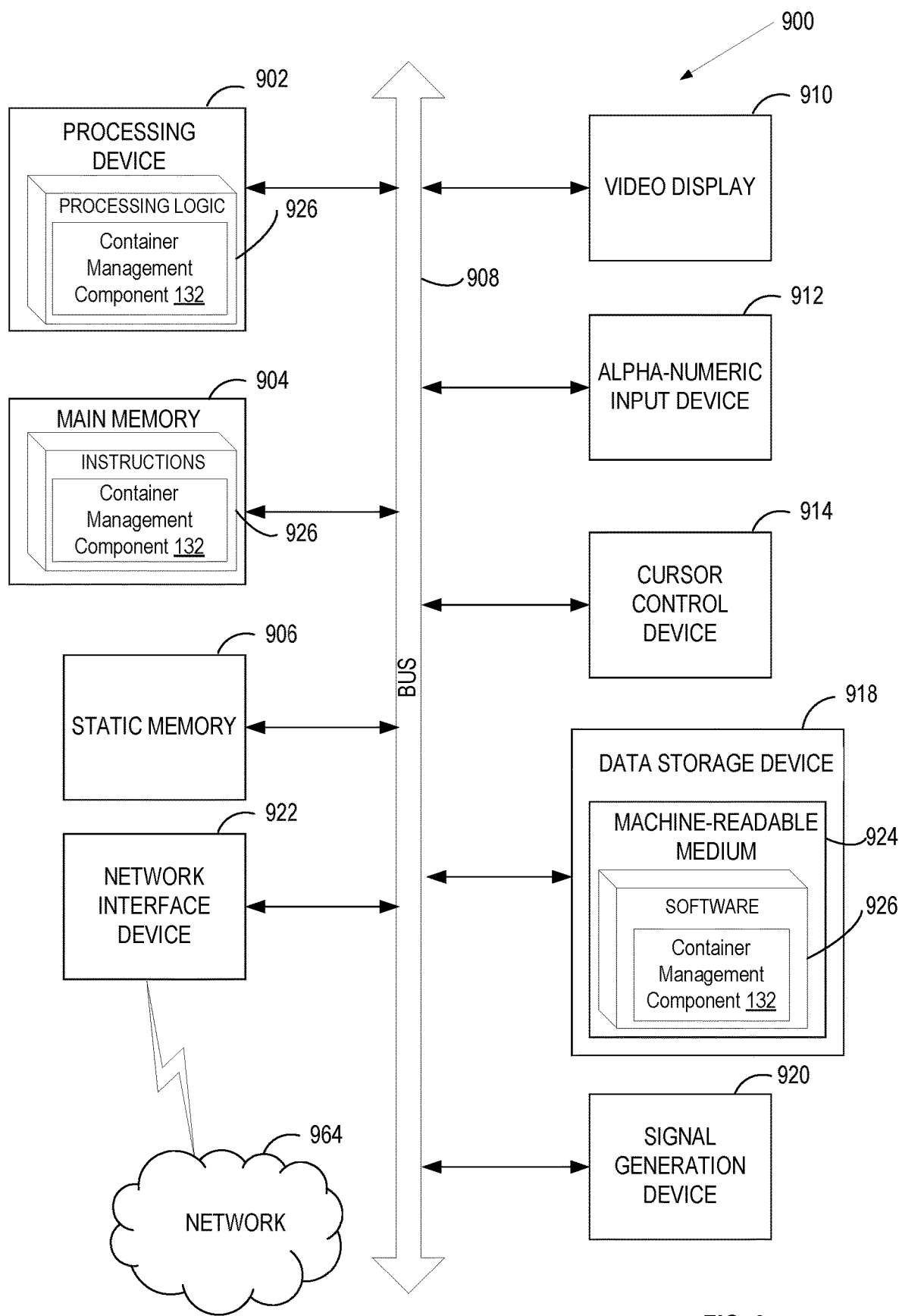
FIG. 9 illustrates a block diagram of one implementation of a computer system.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The computer system 900 includes a processing device 902 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 900 may further include a network interface device 922 communicably coupled to a network 964. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-accessible storage medium 924 on which is stored software 926 embodying any one or more of the methodologies of functions described herein. The software 926 may also reside, completely or at least partially, within the main memory 404 as instructions 926 and/or within the processing device 902 as processing logic 926 during execution thereof by the computer system 900; the main memory 904 and the processing device 902 also constituting machine-accessible storage media.

The machine-readable storage medium 924 may also be used to store instructions 926 to schedule computing tasks, such as the container management component 132 as described with respect to FIGS. 1 and 2, and/or a software library containing methods that call the above applications. While the machine-accessible storage medium 924 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: running a first container corresponding to a first operating system, wherein the first container is created in view of a container image; receiving a user request to switch from the first operating system to a second operating system; in response to receiving the user request, switching, by a processing device, from the first container to a second container corresponding to the second operating system, wherein the second container is created in view of the container image, wherein switching from the first container to the second container comprises: configuring the second container in view of a plurality of configurations of the first container; and running the configured second container.

Example 2 includes the subject matter of example 1, wherein switching from the first container to the second container further comprises: stopping the running of the first container.

Example 3 includes the subject matter of example 1, wherein configuring the second container further comprises: attaching a current working directory related to the first container to the second container.

Example 4 includes the subject matter of example 1, wherein configuring the second container further comprises: importing a shell history associated with the first container to the second container.

Example 5 includes the subject matter of example 1, wherein configuring the second container further comprises: identifying a user identifier associated with the first container; and associating the user identifier with the second container.

Example 6 includes the subject matter of example 1, wherein configuring the second container further comprises: importing a home directory related to the first container to the second container.

Example 7 includes the subject matter of example 1, wherein the first operating system is different from the second operating system.

Example 8 includes the subject matter of example 1, wherein the user request to switch to the second operating system comprises information identifying the second operating system.

Example 9 includes the subject matter of example 1, further comprising: running the first container in response to receiving, via a command line interface, a user request to run the first container, wherein the user request to switch from the first operating system to the second operating system is received via the command line interface.

Example 10 is a method, comprising: running a first container corresponding to a first operating system, wherein the first container is created in view of a container image; in response to receiving a user request to create a copy of the first container, creating a second container in view of the first container; and switching, by a processing device, from the first container to the second container, comprising: configuring the second container in view of a plurality of configurations of the first container; running the configured second container; and stopping the execution of the first container.

Example 11 includes the subject matter of example 10, wherein the user request to create the copy of the first container comprises a request to fork the first container.

Example 12 includes the subject matter of example 10, wherein creating the second container in view of the first container comprises creating a copy of the first container.

Example 13 includes the subject matter of example 10, further comprising: in response to receiving a user request to switch to the first container, switching from the second container to the first container.

Example 14 includes the subject matter of example 10, wherein configuring the second container further comprises: attaching a current working directory related to the first container to the second container.

Example 15 includes the subject matter of example 10, wherein configuring the second container further comprises: importing a shell history associated with the first container to the second container.

Example 16 includes the subject matter of example 10, wherein configuring the second container further comprises: identifying a user identifier associated with the first container; and associating the user identifier with the second container.

Example 17 includes the subject matter of example 10, wherein configuring the second container further comprises: importing a home directory related to the first container to the second container.

Examples 18 is a method, comprising: providing a command line interface for managing a first container corresponding to a first operating system, wherein the first container is created in view of a container image; receiving, via the command line interface, one or more commands concerning a second container corresponding to a second operating system, wherein the second container is created in view of the container image; and in view of the one or more commands, providing at least one prompt related to the second container in the command line interface, wherein the at least one prompt comprises information related to the second container and an identification of a working directory related to the first container.

Example 19 includes the subject matter of example 18, wherein the one or more commands concerning the second container comprises a first command for switching to the second operating system.

Example 20 includes the subject matter of example 18, further comprising: providing, in the command line interface, a shell history related to the second container, wherein the shell history related to the second container comprises a shell history related to the first container.

Example 21 includes the subject matter of example 18, further comprising: receiving, via the command line interface, a second command for switching from the second operating system to the first operating system; and in view of the second command, providing, in the command line interface, at least one prompt related to the first container in the command line interface, wherein the at least one prompt related to the first container comprises information related to the first container and an identification of a working history related to the second container.

Example 22 includes the subject matter of example 18, further comprising: receiving, view the command line interface, a third command for cloning the second container; and in view of the third command, providing at least one prompt related to a third container in the command line interface, wherein the at least one prompt comprises information related to the third container and an identification of a working directory related to the second container, and wherein the third container represents a copy of the second container.

Example 23 includes the subject matter of example 18, further comprising: providing a shell running inside the second container.

Example 24 is a system comprising: a memory; and a processing device operatively coupled to the memory, the processing device to: in response to receiving a first command to switch from a first operating system to a second operating system, switch from a first container to a second container, wherein the first container and the second container are created in view of a container image, wherein the first container comprises an installation of the first operating system, and wherein the second container comprises an installation of the second operating system; and in response to receiving a second command to fork the first container, creating a third container in view of the first container, wherein the third container represent a copy of the first container.

Example 25 includes the subject matter of example 24, wherein the first command and the second command are received via a command line interface.

Example 26 includes the subject matter of example 24, wherein the first operating system is different than the second operating system.

Example 27 includes the subject matter of example 24, wherein, to switch from the first container to the second container, the processing device is further to: configure the second container in view of a plurality of configurations of the first container; run the configured second container; and stop the execution of the first container.

Example 28 includes the subject matter of example 27, wherein, to configure the second container in view of the plurality of configurations of the first container, the processing device is further to: attach a current working directory related to the first container to the second container.

Example 29 includes the subject matter of example 27, wherein, to configure the second container in view of the plurality of configurations of the first container, the processing device is further to import a shell history associated with the first container to the second container.

Example 30 includes the subject matter of example 27, wherein, to configure the second container in view of the plurality of configurations of the first container, the processing device is further to: identify a user identifier associated with the first container; and associate the user identifier with the second container.

Example 31 is an apparatus comprising: a processing device; and a means for running a first container corresponding to a first operating system, wherein the first container is created in view of a container image; a means for receiving a user request to switch from the first operating system to a second operating system; a means for switching from the first container to a second container corresponding to the second operating system.

Example 32 includes the apparatus of example 31, further comprising the subject matter of any of claims 1-30.

Example 33 is a system comprising: a memory; and a processing device operatively coupled to the memory, the processing device to implement the subject matter of any of examples 1-23.

Example 34 is a non-transitory machine-readable storage medium including instructions that, when accessed by a processing device, cause the processing device to implement the subject matter of any of examples 1-30.

Unless specifically stated otherwise, terms such as "receiving," "invoking," "associating," "providing," "storing," "performing," "detecting," "initiating," "obtaining," "generating," "determining," "updating," "modifying," "attaching," "mounting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600, 700, and 800 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

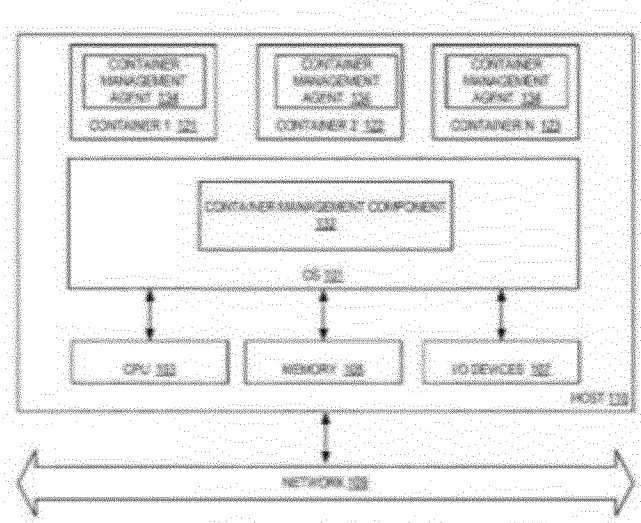

What is claimed is:

1. A method comprising:
   creating a first container that includes an installation of a first operating system, wherein the first container is created in view of a container image;
   causing a first container management agent in the first container to run a user interface in the first container;
   receiving, from the user interface running in the first container, a first command to switch from the first operating system to a second operating system; and
   responsive to receiving the first command to switch from the first operating system to the second operating system:
      creating, in view of the container image, a second container that includes an installation of the second operating system;
      configuring the second container in view of one or more configurations of the first container; and
      causing a second container management agent in the second container to run the user interface in the second container, wherein the second container management agent is configured to initiate execution in the second container of a second command received from the user interface in the second container.

2. The method of claim 1, further comprising: responsive to creating the first container, associating a user identifier with the first container,
   wherein the user interface enables a user identified by the user identifier to manage the first container and the second container in a single terminal.

3. The method of claim 1, wherein the user interface comprises a command line interface that provides a prompt identifying a particular container in which the user interface is running.

4. The method of claim 1, wherein the first container is associated with a user identifier, and configuring the second container comprises:
   associating the user identifier with the second container
   attaching a current working directory of the first container to the second container; and
   importing a shell history associated with the first container to the second container, wherein the shell history specifies one or more commands that were executed in the first container.

5. The method of claim 1, wherein the user interface comprises a shell, the first container management agent comprises a first shell script, and the second container management agent comprises a second shell script.

6. The method of claim 1, wherein configuring the second container comprises:
   importing a home directory related to the first container to the second container.

7. The method of claim 1, wherein the first operating system is different than the second operating system.

8. The method of claim 1, wherein the first command to switch to the second operating system comprises information identifying the second operating system.

9. A non-transitory machine-readable storage medium including instructions that, when accessed by a processing device, cause the processing device to:
   create a first container that includes an installation of a first operating system, wherein the first container is created in view of a container image;
   cause a first container management agent in the first container to run a user interface in the first container;
   receive, from the user interface running in the first container, a first command to switch from the first operating system to a second operating system; and
   responsive to receiving the first command to switch from the first operating system to the second operating system:
      create, in view of the container image, a second container that includes an installation of the second operating system;
      configure the second container in view of one or more configurations of the first container; and
      cause a second container management agent in the second container to run the user interface in the second container, wherein the second container management agent is configured to initiate execution in the second container of a second command received from the user interface in the second container.

10. A system comprising:
a memory; and
a processing device operatively coupled to the memory, the processing device to:
- create a first container that includes an installation of a first operating system, wherein the first container is created in view of a container image;
- cause a first container management agent in the first container to run a user interface in the first container;
- receive, from the user interface running in the first container, a first command to switch from the first operating system to a second operating system; and
- responsive to receiving the first command to switch from the first operating system to the second operating system:
  - create, in view of the container image, a second container that includes an installation of the second operating system;
  - configure the second container in view of one or more configurations of the first container; and
  - cause a second container management agent in the second container to run the user interface in the second container, wherein the second container management agent is configured to initiate execution in the second container of a second command received from the user interface in the second container.

11. The system of claim 10, wherein the processing device is further to:
associate a user identifier with the first container responsive to creating the first container, wherein the user interface enables a user identified by the user identifier to manage the first container and the second container in the same terminal.

12. The system of claim 10, wherein the first operating system is different than the second operating system.

13. The system of claim 10, wherein the processing device is further to:
stop an execution of the first container responsive to receiving the first command to switch from the first operating system to the second operating system.

14. The system of claim 13, wherein the processing device is further to, in response to receiving a third command to fork the first container, create a third container in view of the first container, wherein the third container represents a copy of the first container.

15. The system of claim 10, wherein the user interface comprises a command line interface that provides a prompt identifying a particular container in which the user interface is running.

16. The system of claim 10, wherein the first container is associated with a user identifier, and to configure the second container in view of the one or more configurations of the first container, the processing device is further to:
- associate the user identifier with the second container
- attach a current working directory of the first container to the second container; and
- import a shell history associated with the first container to the second container, wherein the shell history specifies one or more commands that were executed in the first container.

17. The non-transitory machine-readable storage medium of claim 9, wherein the user interface comprises a command line interface that provides a prompt identifying a particular container in which the user interface is running.

18. The non-transitory machine-readable storage medium of claim 17, wherein the instructions further cause the processing device to:
in response to receiving a second command to create a copy of the first container, create the second container in view of the first container, wherein the second command to create the copy of the first container comprises a request to fork the first container.

19. The non-transitory machine-readable storage medium of claim 18, wherein, to create the second container in view of the first container, the processing device is further to create a copy of the first container.

20. The non-transitory machine-readable storage medium of claim 17, wherein the processing device is further to:
responsive to creating the first container, associate a user identifier with the first container,
wherein the user interface enables a user identified by the user identifier to manage the first container and the second container in the same terminal.

\* \* \* \* \*

UNITED STATES PATENT AND TRADEMARK OFFICE
CERTIFICATE OF CORRECTION

| | |
|---|---|
| PATENT NO. | : 11,586,455 B2 |
| APPLICATION NO. | : 16/281984 |
| DATED | : February 21, 2023 |
| INVENTOR(S) | : Raymond Strode et al. |

It is certified that error appears in the above-identified patent and that said Letters Patent is hereby corrected as shown below:

On the Title Page

Item (12), correct the named inventorship to "Strode et al." as shown on the attached title page Item (72), correct the first named inventor and residence to "Raymond Strode, Westford, MA (US)" as shown on the attached title page Signed and Sealed this
Tenth Day of September, 2024

*Katherine Kelly Vidal*

Katherine Kelly Vidal
*Director of the United States Patent and Trademark Office*

(12) United States Patent
Strode et al.

(10) Patent No.: US 11,586,455 B2
(45) Date of Patent: Feb. 21, 2023

(54) MANAGING CONTAINERS ACROSS MULTIPLE OPERATING SYSTEMS

(71) Applicant: Red Hat, Inc., Raleigh, NC (US)

(72) Inventors: Raymond Strode, Westford, MA (US); Alexander Larsson, Stockholm (SE); Matthias Clasen, Westford, MA (US); Debarshi Ray, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/281,984

(22) Filed: Feb. 21, 2019

(65) Prior Publication Data
US 2020/0272488 A1 Aug. 27, 2020

(51) Int. Cl.
*G06F 9/455* (2018.01)
*G06F 9/46* (2006.01)
(Continued)

(52) U.S. Cl.
CPC ...... *G06F 9/4555* (2013.01); *G06F 9/45512* (2013.01); *G06F 9/45558* (2013.01);
(Continued)

(58) Field of Classification Search
CPC ........... G06F 16/2379; G06F 16/9024; G06F 2009/45579; G06F 2009/45591; G06F 8/60; G06F 9/455; G06F 9/45512; G06F 9/45545; G06F 9/45558; G06F 9/4856; G06F 9/5061; G06F 21/577; G06F 2009/45562; G06F 2009/4557; G06F 21/55; G06F 21/56; H04L 45/02; H04L 63/1408
See application file for complete search history.

(56) References Cited

U.S. PATENT DOCUMENTS 10,606,646 B1* 3/2020 Christensen ........ G06F 9/5077
10,838,833 B1* 11/2020 Jhuja ............... G06F 11/0706
(Continued)

FOREIGN PATENT DOCUMENTS

RU          2550559 C2 *   5/2015        H04W 24/08

OTHER PUBLICATIONS

Aspernäs, Andreas, and Mattias Nemsen. "Container Hosts as Virtual Machines: A performance study." (2016). Virginia Tech. (Year : 2016).*

(Continued)

*Primary Examiner* — Kenneth Tang
(74) *Attorney, Agent, or Firm* — Lowenstein Sandler LLP

(57) ABSTRACT

Aspects of the disclosure provide for mechanisms for managing containers across operating systems in a computer system. A method of the disclosure includes: running a first container corresponding to a first operating system, wherein the first container is created in view of a container image; receiving a user request to switch from the first operating system to a second operating system; in response to receiving the user request, switching, by a processing device, from the first container to a second container corresponding to the second operating system, wherein the second container is created in view of the container image, wherein switching from the first container to the second container comprises configuring the second container in view of a plurality of configurations of the first container; and running the configured second container.

20 Claims, 9 Drawing Sheets